United States Patent [19]
Graves et al.

[11] Patent Number: 5,946,472
[45] Date of Patent: Aug. 31, 1999

[54] APPARATUS AND METHOD FOR PERFORMING BEHAVIORAL MODELING IN HARDWARE EMULATION AND SIMULATION ENVIRONMENTS

[75] Inventors: Jeffrey Steven Graves; Roy Glenn Musselman; Jeffrey Joseph Ruedinger, all of Rochester, Minn.

[73] Assignee: International Business Machines Corporation, Armonk, N.Y.

[21] Appl. No.: 08/742,235

[22] Filed: Oct. 31, 1996

[51] Int. Cl.⁶ .................................................. G06F 9/455
[52] U.S. Cl. ...................................... 395/500; 395/500.44
[58] Field of Search .............................. 364/578; 395/500

[56] References Cited

U.S. PATENT DOCUMENTS

| | | |
|---|---|---|
| 4,720,778 | 1/1988 | Hall et al. . |
| 5,313,618 | 5/1994 | Pawloski ................................. 395/500 |
| 5,452,239 | 9/1995 | Dai et al. ................................ 364/578 |
| 5,544,067 | 8/1996 | Rostoker et al. ........................ 364/489 |
| 5,546,562 | 8/1996 | Patel ....................................... 364/578 |
| 5,678,032 | 10/1997 | Woods et al. ........................... 395/500 |

*Primary Examiner*—Kevin J. Teska
*Assistant Examiner*—Ayni Mohamed
*Attorney, Agent, or Firm*—Derek P. Martin; S. Jared Pitts

[57] ABSTRACT

In accordance with the present invention, a system for providing high-speed sequential modeling in a simulator or emulator environment is provided. The system includes a sequential control system (microprocessor board) which is attached directly to an emulator. The sequential control system cycles or operates at a higher speed than the emulator. This allows the sequential control system to execute multiple commands during each hardware emulation cycle so that the concurrent operations model within the accelerator/emulator and the sequential operations model within the sequential control system achieve a high degree of parallel operation, greatly enhancing system speed and performance. Further, the system includes direct high-speed connections between the sequential control system and the host workstation so that the control system can be programmed to execute a sequential model and/or to exchange data directly with the host without actually passing any information through the hardware emulator/accelerator. The sequential control system software is written in a high level programming language rather than a hardware description language. In addition, the sequential control system allows reuse of the board to model many different types of systems and hardware components. This combination of reusability, ease of model creation, and reduced communication overhead provides increased flexibility, reduced costs, and greater modeling efficiency than is available using other known systems. The system and method of the present invention effectively and efficiently merges sequential models with hardware emulation/acceleration. In addition, the new system is compatible with existing simulation/emulation environments and equipment such as IBM's ET3.

26 Claims, 6 Drawing Sheets

APPARATUS AND METHOD FOR PERFORMING BEHAVIORAL MODELING IN HARDWARE EMULATION AND SIMULATION ENVIRONMENTS

BACKGROUND OF THE INVENTION

1. Technical Field

This invention generally relates to systems modeling and development, and more specifically relates to hardware simulators and emulators.

2. Background Art

Today, our society is heavily dependant upon computers for everyday activity. Computers are found in our homes, in business offices, and in most production and manufacturing environments. Along with general purpose applications, computers also form the basis for many special purpose systems such as inventory systems used in grocery stores, control systems for aircraft, and a host of other specific functions. Most computer systems are controlled by a microprocessor or central processing unit (CPU) and have multiple peripheral devices which work in concert to perform the various functions for which the computer system has been designed.

Today's microprocessor-based systems are a highly complex combination of hardware and software. Even the most basic computer systems contain multiple circuits and control systems that must function within very specific constraints in order for the computer system to operate as designed. In addition, many of the hardware and software technologies associated with microprocessor-based systems are constantly changing in response to advancing technology and increased consumer demand.

As technology continues to progress, new systems and new components for existing microprocessor-based systems are constantly being developed. Systems and components that existed only as designs a few short years ago have already entered production, been marketed, and are becoming obsolete today. In order to be competitive in this rapidly evolving environment, it is necessary for technology-based companies to quickly and efficiently design new systems and components that take advantage of the latest technological advances.

When designing a new system or component, it is often necessary to determine how the new system or component will interact with and respond to existing systems or components. Without a thorough understanding of the performance characteristics and operational parameters associated with a new component or system, significant problems may surface once manufacturing and distribution begin. While a proposed system or component could actually be manufactured in limited numbers for testing and evaluation purposes, it is usually more convenient, less time-consuming, less costly, and more efficient to create a model or functional prototype of the proposed system. This modeling is typically accomplished by using simulation systems that model hardware function and performance in software, hardware-assisted software simulation systems, or hardware emulation systems that use a combination of software and hardware to model a circuit or system design.

While often successful, current methods and systems for performing simulation and emulation are somewhat limited in scope and application. The existing limits are a combination of operational design and implementation restrictions which increase development costs and constrain rapid development of new systems. These limitations can be better explained in conjunction with FIGS. 1–3 which illustrate a range of modeling options progressing from a pure software-based simulation environment (FIG. 1) to a hardware-assisted emulation environment (FIG. 3).

Referring now to FIG. 1, a typical simulation environment 100 includes a workstation 110 executing a concurrent operations model 120 and a sequential operations model 130. In addition, communication link 125 provides an intercommunication link between concurrent operations model 120 and sequential operations model 130. Communication link 125 is usually implemented with memory components (not shown) located within workstation 110. Software-based simulation systems typically have the ability to create models that can represent either concurrent or sequential operations. Concurrent modeling refers to a description of operational behavior which is designed to represent actual hardware logic components, where many events occur in parallel or at the same time. Each of these events will typically represent the transfer of information from one internal system register or memory location to another. Sequential modeling, on the other hand, is used to simulate operations or events which happen only one at a time in a serial fashion. The flow of events progresses from one to another in a sequence or series of steps.

Workstation 110 may be any type of microprocessor-based computer or computer system known to those skilled in the art. In addition to the standard operating system overhead associated with workstation 110, workstation 110 is also processing concurrent operations model 120 and sequential operations model 130. Since workstation 110 is a general purpose computer, it has additional tasks to perform and a certain amount of operational overhead which consumes a portion of the processing capability of workstation 110. As noted in FIG. 1, in typical simulation environment 100, concurrent operations model 120 may account for approximately 90% of the available operational load of workstation 110 while sequential operations model 130 accounts for the remaining 10%.

Referring now to FIG. 2, simulation environment 100 of FIG. 1 has been modified to create a simulation environment 200. Simulation environment 200 includes workstation 110, concurrent operations model 120, sequential operations model 130, a communication link 210, and an accelerator 220. In simulation environment 200, concurrent operations model 120 has been removed from the control and operation of workstation 110. Concurrent operations model 120 is now implemented in accelerator 220. Accelerator 220 is generally a hardware solution, such as Field Programmable Gate Arrays (FPGAs) or other specifically designed custom accelerator hardware that may be dynamically configured to implement concurrent operations model 120. Communication link 210 is a bus or network connection used to transmit test vectors and other operational data between workstation 110 and concurrent operations model 120. The overhead associated with communication link 210 can, in some cases, cause delays and degrade the overall performance of simulation environment 200.

By moving concurrent operations model 120 outside of workstation 110, sequential operations model 130, which used to take only 10% of the execution time, now becomes the limiting factor and consumes 90% of the execution time of the simulation. Thus we see that moving concurrent operations model 120 outside of workstation 110 (FIG. 2) results in a performance increase that is an order of magnitude greater than the performance of system 100 shown in FIG. 1. While simulation environment 200 is considerably more efficient and performs a given simulation more quickly than simulation environment 100, simulation environment 200 is still somewhat limited by the high utilization rate of communication link 210 and the overhead of working with sequential operations model 130 on workstation 110.

Referring now to FIG. 3, simulation environment 200 of FIG. 2 has been modified to create an emulation environment 300. In addition to workstation 110, concurrent operations model 120, sequential operations model 130, and communication link 210, emulation environment 300 includes: emulator/accelerator 310; a high speed/high bandwidth communication link 320; a target hardware system 330; and an optional feed-back link 340.

Emulator/accelerator 310 is a large-scale hardware configuration implemented with Field Programmable Gate Arrays (FPGAs) or some other type of custom hardware. This system is capable of emulating many different types of computer system hardware components including, for example, memory devices. An example of emulator/accelerator 310 is IBM's ET3. Emulator/accelerator 310 is capable of modeling concurrent operations such as concurrent operations model 120. Since emulator/accelerator 310 is designed to operate under the control of workstation 110, sequential operations model 130 and concurrent operations model 120 may operate in parallel. Note, however, that sequential operations model 130 takes much more execution time than concurrent operations model 120 because of the operational overhead associated with workstation 110 and communication link 210. The overall performance of system 300 is still limited by the speed of executing sequential operations model 130 on workstation 110. While some degree of parallel operation of concurrent operations model 120 and sequential operations model 130 may occur, in a practical sense concurrent operations model 120 will spend most of its time waiting for sequential operations model 130 to finish processing or for data to be delivered over communication link 210.

Target hardware system 330 may be a part of a system under test and can represent any system or portion of a system that needs to be tested. One example of target hardware system 330 is a personal computer with the microprocessor removed. A prototype microprocessor may be modeled using emulator 310 and attached to target hardware system 330 via communication link 320. In this case, communication link 320 would consist of several interface cables and adapter pods. The system will then be exercised and tested for compliance with design parameters and specifications. Target hardware system 330 includes any hardware that needs to be tested, whether the hardware is a portion of an integrated circuit, an entire integrated circuit, or multiple integrated circuits.

Workstation 110 typically provides test data (such as test vectors) to emulator/accelerator 310 or target hardware system 330, which then performs the desired tests. Results of the test may be returned to workstation 110 via optional feedback link 340 or may be passed via communication link 320 to emulator/accelerator 310 and then to workstation 110 via communication link 210.

Given the limitations associated with existing systems as described above, there is a need to provide a system whereby simulation and emulation can be accomplished without the limitations of existing systems. This system should allow for simulation and emulation to take place at greater speeds and with increased flexibility. In addition, it is desirable to provide a system which is compatible with existing emulation and simulation environments.

SUMMARY OF THE INVENTION

In accordance with the present invention, a system for providing high-speed sequential modeling in a simulator or emulator environment is provided. It should be noted that the term emulator as used to describe the present invention can refer to a hardware emulator, a simulation accelerator, an emulator used as a simulation accelerator, or a simulation accelerator used as an emulator. The system includes a sequential control system (microprocessor board) which is attached directly to an emulator. The sequential control system cycles or operates at a higher speed than the emulator. This allows the sequential control system to execute multiple commands during each hardware emulation cycle so that the concurrent operations model within the accelerator/emulator and the sequential operations model within the sequential control system achieve a high degree of parallel operation, greatly enhancing system speed and performance.

Further, the system includes direct high-speed/high-bandwidth connections between the sequential control system and the host workstation so that the sequential control system can be programmed to execute a sequential model and/or to exchange data directly with the host without actually passing any information through the hardware emulator. The sequential control system software is written in a high-level programming language such as C or C++ rather than a High Level Design Language (HDL) such as VHDL or Verilog. This allows sequential models to be created and implemented more easily. In addition, the sequential control system allows the board to be quickly reconfigured and reused to model many different types of systems and hardware components. This combination of reusability, ease of model creation, and reduced communication overhead provides increased flexibility, reduced costs, and greater modeling efficiency than is available using other known systems. The system and method of the present invention effectively and efficiently merge sequential models with hardware emulation/acceleration. In addition, the new system is compatible with existing simulation/emulation environments and equipment such as IBM's ET3.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
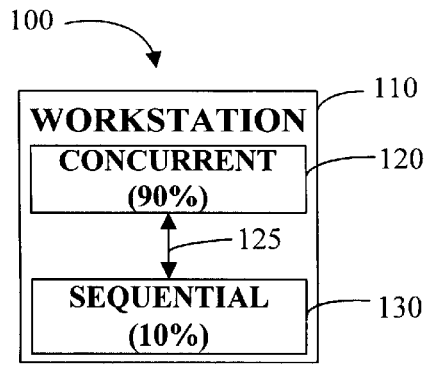
FIG. 1 is a block diagram of a typical workstation-based simulation environment.
Figure 2:
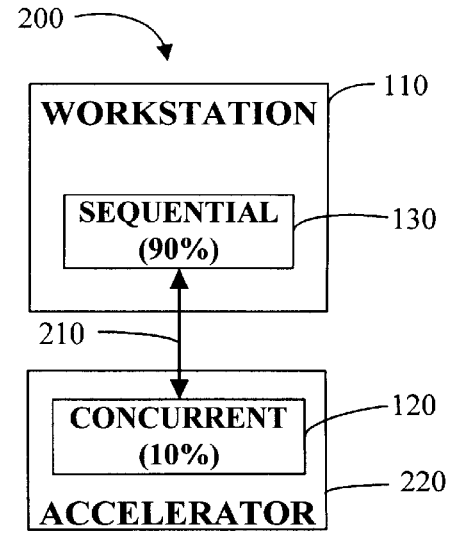
FIG. 2 is a block diagram of a simulation environment where the concurrent operations model functions are performed by an accelerator.
Figure 3:
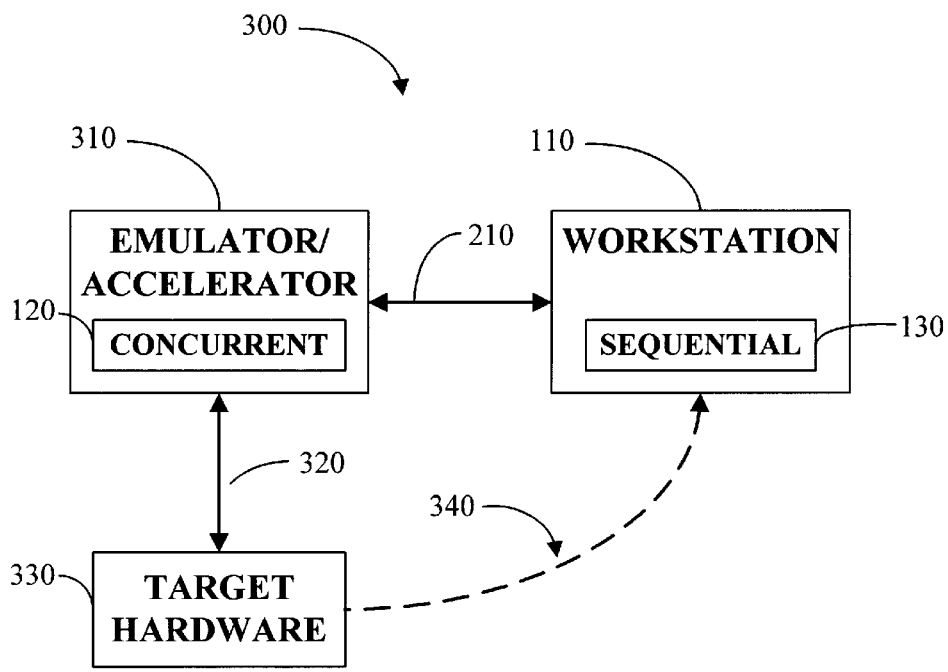
FIG. 3 is a block diagram of a known hardware emulator environment.

The Overview Section immediately below is intended to provide an introductory explanation of basic emulator/accelerator operations and history for individuals who need additional background in this area. Those who are skilled in the art may wish to skip this section and begin with the Detailed Description Section instead.

Overview

Simulation systems have been used for many years to model hardware systems or components in software. Software simulation systems typically have the ability to create models that can represent either concurrent or sequential operations. Concurrent modeling refers to a description of operational behavior which is designed to represent actual hardware logic components, where many events occur in parallel or at the same time. Each of these events will typically represent the transfer of information from one internal system register or memory location to another. Sequential modeling, on the other hand, is used to simulate operations or events which happen only one at a time in a serial fashion. The flow of events progresses from one to another in a sequence or series of steps. Whether a portion of a system should be modeled as a concurrent operation or as a sequential operation is typically a design choice made when the system model is created.

Typically, a design engineer will use concurrent modeling to describe the operation of logic which will later be fabricated as actual circuits and components, while sequential modeling will be used to simulate behavioral operations such as test and control functions. This choice is made because programming languages, such as C or C++, which are used in sequential modeling, provide more flexibility and power than is possible if the sequential model were implemented in hardware. Therefore, behavioral operation models simulated using sequential languages take less time to design, implement, and maintain.

As described above, the performance of a simulator may be dramatically improved by implementing some or all of the concurrent model in hardware rather than software. An accelerator typically includes one or more arrays of FPGAs or other custom hardware, which may be programmed to represent the hardware function or functions necessary to implement the concurrent model.

Hardware emulation is a technology related to simulation which is used to model a hardware design. In a typical hardware emulation environment, the model hardware design may also be attached to existing hardware. Hardware emulators may be used to verify the design of an integrated circuit before fabricating the circuit on a semiconductor chip, or may be used to test a proposed system design that includes multiple integrated circuits. In this case, the emulator's responsibility is to accept stimulus from the target system and provide an appropriate response based on the behavior of the equipment being emulated. For the purpose of discussion, either the emulator hardware or the target system hardware may be referred to as a hardware test system.

A simulator with an accelerator typically includes a host computer (such as a workstation) that communicates with the accelerator. The accelerator executes a concurrent model while the workstation executes a sequential model. By implementing the most time-intensive simulation functions in hardware, the accelerator provides significant gains in performance compared to a simulation environment where both sequential and concurrent operations are modeled in software.

Presently available hardware emulation and simulation acceleration systems can generally perform concurrent modeling efficiently but have certain inherent limitations which significantly constrain their ability to performing sequential modeling. This is primarily due to the fact that while concurrent models can be straightforwardly converted to a "blocks, pins, nets" netlist format that can be mapped onto the emulation or simulation acceleration hardware, most sequential models are much more difficult to map into such a netlist format. With the evolution of high level synthesis techniques, a limited number of sequential constructs may be effectively mapped, but it is unlikely that all of the features that exist today in a sequential language like C or C++ will be able to be mapped into concurrent form. Even the features that are currently capable of being mapped may not be done in a manner that would allow efficient emulation.

One way that emulation systems are used in a systems development environment is to systematically apply multiple bit vectors (known generally as test vectors) to the target system under the control of the host workstation, and to read the results of those tests either from the target system itself or from the accelerator. The accelerator typically implements a concurrent model that operates at speeds significantly higher than the speed of the sequential model being implemented on the host workstation. As a result, the emulator must often wait for relatively long periods of time while the sequential model executes on the host. The execution time of the sequential model on the host and/or the communication exchange between the sequential model and the concurrent model becomes a bottleneck, degrading overall system performance.

This same bottleneck exists when a hardware accelerator is combined with a simulator to form a "co-simulation" environment. Concurrent operations are programmed, compiled, and then modeled on the hardware accelerator while sequential operations continue to be modeled in software on the simulator. However, while the increase in overall execution speed using this approach is significant, the execution speed is still much slower than desired. Because the hardware accelerator, the software simulator, and the simulation control environment have to interact during the simulation, they effectively remain in "lock-step" with each other. The various components will generally take turns, alternating execution for every cycle of simulation advancement. In most typical systems, only one of the components are active at a time. The various components take turns performing their respective functions. As discussed in the detailed description section below, the behavioral modeling technique of the present invention substantially increases the likelihood of executing both sequential and concurrent models simultaneously, providing a significant performance improvement over existing systems.

The execution time of the behavioral models in the simulator become the bottleneck to system performance and the result is that the accelerator is idle most of the time, waiting for input from the host workstation. This approach, therefore, necessarily sacrifices overall execution speed by throttling the speed of the hardware emulator to match the speed of the simulator. The remainder of this specification will describe how a sequential control system in accordance with a preferred embodiment of the present invention may be used to greatly enhance the performance of both emulation and simulation systems by processing the sequential operations model with a dedicated sequential modeling system and in parallel with the concurrent operations model.
Detailed Description In accordance with the present invention, a system for providing sequential modeling in an emulation or simulation environment is provided. The system includes a sequential control system (e.g., microprocessor board) which is attached directly to a hardware emulator. The sequential control system operates at a higher clock speed than the hardware emulator. This allows the sequential control system to execute multiple commands during each hardware emulation cycle so that the hardware emulator effectively doesn't recognize that multiple sequential operations have occurred from one emulation cycle to the next.

Further, the system includes direct high-speed connections between the sequential control system and the host workstation so that the control system can be programmed to execute a sequential model and/or to exchange data directly with the host workstation without actually passing any information through the hardware emulator or accelerator. The sequential control system software is written in a high-level programming language rather than a hardware description language. In addition, the sequential control system allows reuse of the board to model many different types of systems and hardware components by simply re-programming the system. This combination of reusability, ease of model creation, and reduced communication overhead provides increased flexibility, reduced costs, and greater modeling efficiency than is available using other known systems. The system and method of the present invention effectively and efficiently merges sequential models with hardware emulation/acceleration.

Most standard microprocessor boards operate at speeds in the 25 MHz–100 MHz range while most large scale hardware emulation systems operate at much slower speeds, typically in the 100 KHz–1 MHZ range. Given this disparity in the operational speeds of the two different systems, it is possible to have the microprocessor controller board receive input from the hardware emulator system, calculate the appropriate response, and supply the response to the hardware emulator system without degrading the performance of the hardware emulator system.

Figure 4:
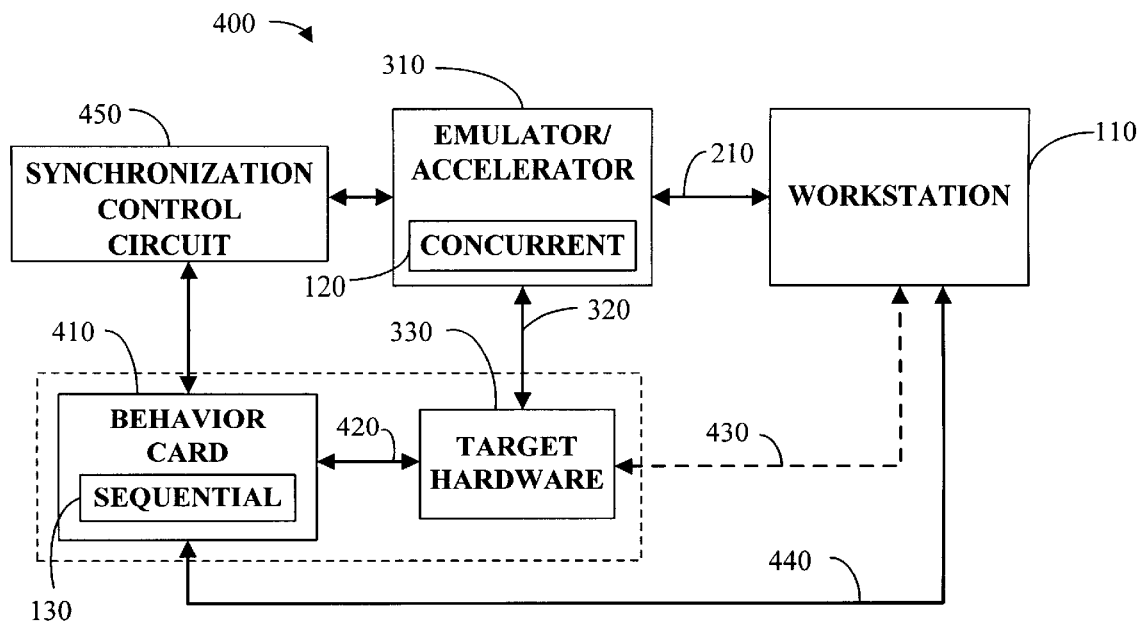
FIG. 4 is a block diagram of a preferred embodiment of the present invention in an emulation environment.

Referring now to FIG. 4, a system 400 for performing hardware emulation according to a preferred embodiment of the present invention includes: workstation 110; emulator/accelerator 310 running concurrent operations model 120; behavior card 410 running sequential operations model 130; communication link 210 which connects workstation 110 with emulator/accelerator 310; high speed/high-bandwidth communication link 320; target hardware system 330; high speed/high-bandwidth communication link 420; optional feed-back communication link 430; a dedicated communication link 440; and a synchronization control circuit 450.

In system 400, the operational and control functions normally under the direction of workstation 110 have been programmed into behavior card 410. Note that behavior card 410 is a preferred embodiment of a sequential control system in accordance with the present invention. In addition, although system 400 is illustrated with only one behavior card 410, multiple behavior cards 410 may be cascaded as required to perform the desired modeling functions. Workstation 110 acts as a program source for behavior card 410 and also provides operational support for many system functions. Workstation 110 transfers the instructions necessary to run the desired simulation into behavior card 410 via dedicated communication link 440. It should be noted that other types of program sources are contemplated and are within the scope of the present invention. For example, an Erasable Programmable Read Only Memory (EPROM) might be used to provide the instructions for behavior card 410. Alternatively, a Direct Access Storage Device (DASD) could be used as a program source. Basically, any type of connection or system, internal or external to behavior card 410 that can be used to provide the necessary data or instructions can be considered a program source. Dedicated communication link 440 is a high-speed connection which allows system 400 to operate without using communication link 210 to transfer information during emulation. If the nature of the sequential model 130 is such that it requires no interaction with workstation 110, then communication link 440 may be eliminated. Further, since workstation 110 is not directly involved in performing the hardware emulation process, workstation 110 can be processing other data or performing other tasks for the duration of the hardware emulation process.

After the hardware emulation process has been completed, or intermittently during the process, the results of the process may be passed back to workstation 110 for evaluation via several different paths. For example, the emulation process results may be passed to target hardware system 330 and then either directly to workstation 110 via optional feedback link 430 or to emulator/accelerator 310 and then to workstation 110 via communication link 210. Alternatively, the results may be passed directly to workstation 110 via dedicated communication link 440. The use of dedicated communication link 440 is generally preferred due to the increased performance capabilities compared to available alternative communication paths.

Synchronization control circuit 450 serves to coordinate the data transfers that occur during the emulation process between emulator/accelerator 310 and behavior card 410. Since portions of the emulation process may be occurring in parallel, synchronization circuit 450 serves to maintain the integrity of data flow between concurrent operations model 120 and sequential operations model 130. Emulator/accelerator 310 is operating at a much slower speed than behavior card 410 and, therefore, the portions of the emulation process being performed by each component will operate at different speeds in accordance with the operating cycles of the individual components. Emulator/accelerator 310 may execute a single cycle of concurrent operations model 120 while behavior card 410 executes multiple cycles of sequential operations model 130. In order to keep a valid data flow between the various components, synchronization control circuit 450 will cause data to be latched in both directions at specific times to achieve the synchronization of sequential operations model 130 and concurrent operations model 120 and to maintain the integrity of the data that is passed between the components.

Figure 5:
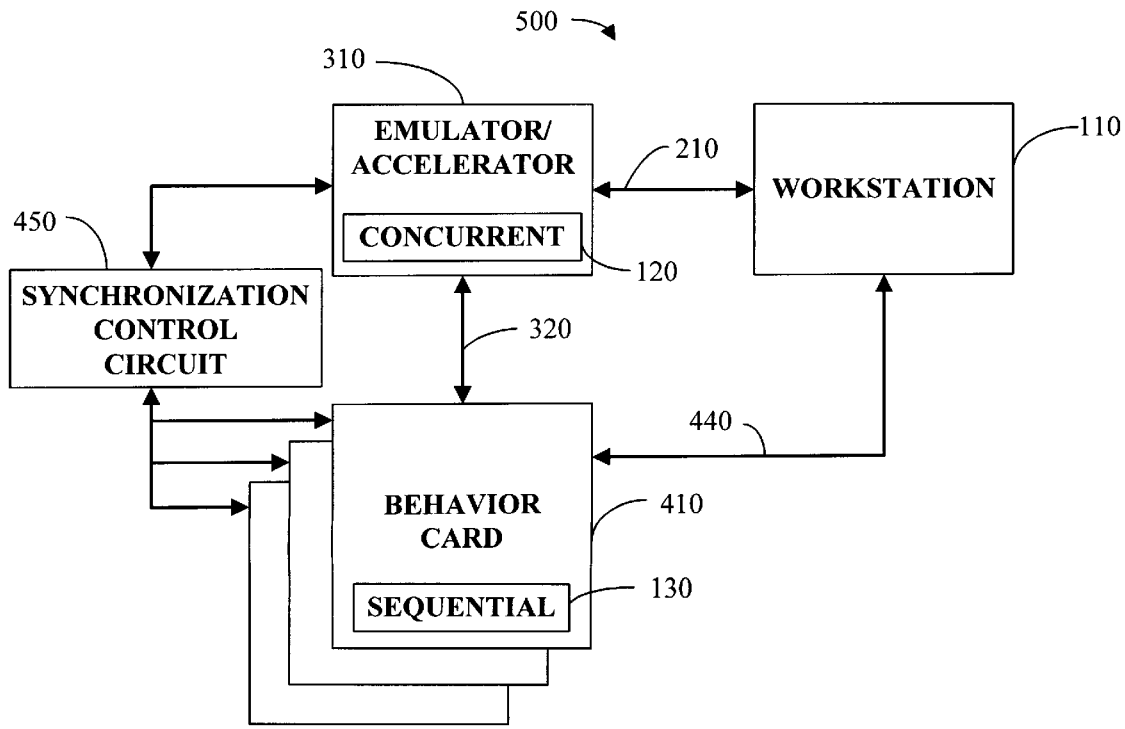
FIG. 5 is a block diagram of a preferred embodiment of the present invention in a simulation environment.

Referring now to FIG. 5, a system 500 for performing hardware-accelerated software simulation according to a preferred embodiment of the present invention includes: workstation 110; emulator/accelerator 310 running concurrent operations model 120; one or more behavior cards 410, each running some sequential operations model 130; communication link 210 which connects workstation 110 with emulator/accelerator 310; high speed/high bandwidth communication link 320; dedicated communication link 440; and synchronization control circuit 450.

Once again, since workstation 110 is not directly involved in the hardware emulation process, workstation 110 can be processing other data or performing other tasks for the duration of the hardware emulation process. After the hardware emulation process has been completed, the results of the process may be passed back to workstation 110 via communication link 210 or dedicated communication link 440. This configuration is similar to the emulation model described above in FIG. 4, but no physical target hardware system 330 exists. The entire model is implemented between emulator/accelerator 310 and behavior card(s) 410. As noted above, multiple behavior cards 410 may be cascaded as required to perform software simulation of various hardware functions.

Figure 6:
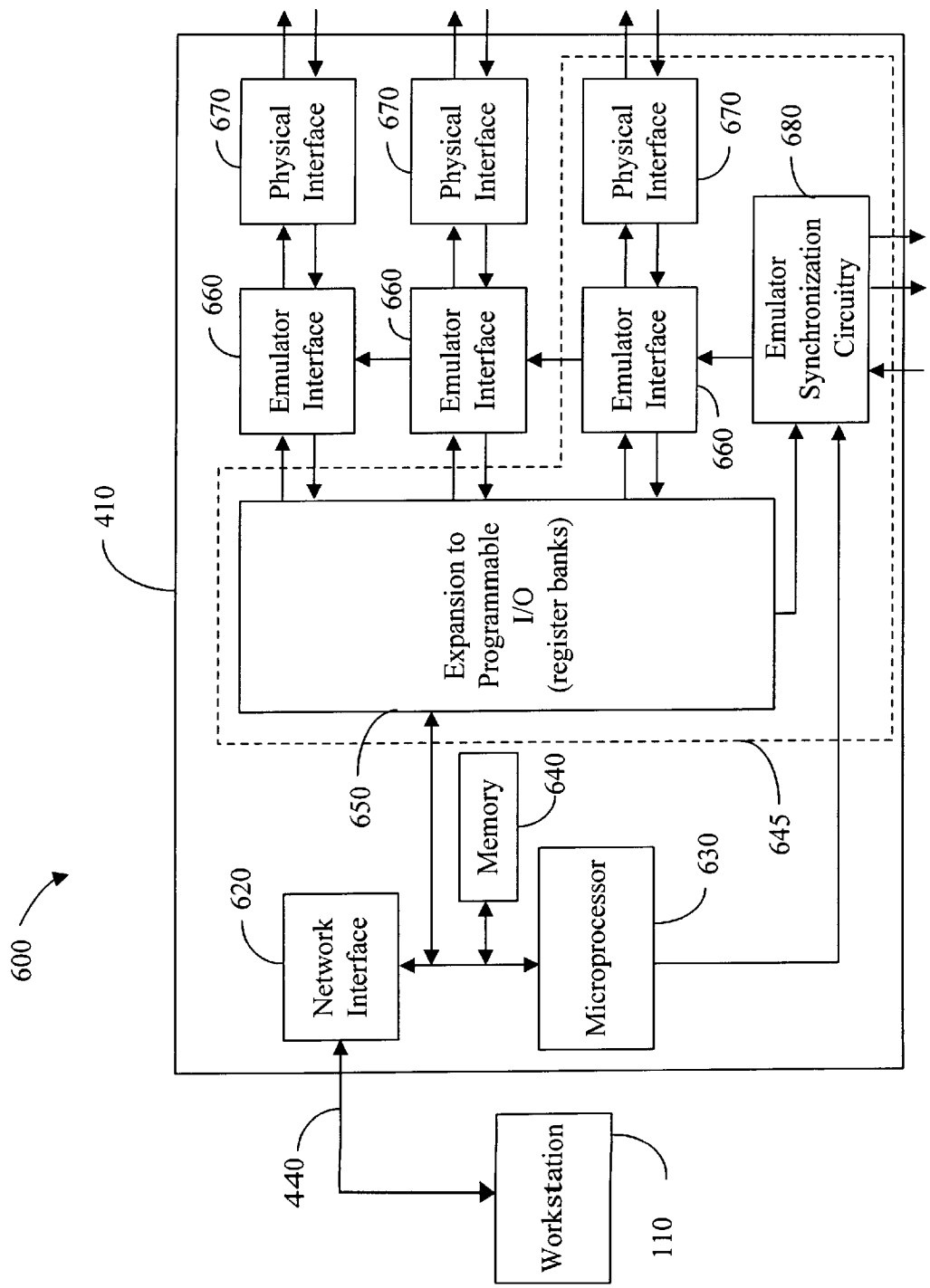
FIG. 6 is a more detailed block diagram of a system in accordance with a preferred embodiment of the present invention showing a detailed implementation of the behavior card.

Referring now to FIG. 6, a system 600 according to a preferred embodiment of the present invention includes: workstation 110; a dedicated communication link 440; and behavior card 410. Behavior card 410 comprises: a network interface 620; a microprocessor 630; a memory 640; an expansion module 650; emulator interfaces 660; physical interface modules 670; emulator synchronization circuitry 680; and interface block 645. Interface block 645 comprises: expansion module 650; a single emulator interface module 660; a single physical interface module 670; and emulator synchronization circuitry 680. Interface block 645 is described in conjunction with FIG. 7 below.

Dedicated communication link 440 is a preferred embodiment of dedicated communication link 440 as described above (FIG. 4). Dedicated communication link 440 provides the communication path to one or more behavior cards and possibly the rest of the emulation system, including the simulator. Dedicated communication link 440 may be implemented in many different ways. For example, dedicated communication link 440 may be a bus connected to workstation 110 or, alternatively, may be any type of network connection known to those skilled in the art. Network interface 620 provides the interface between microprocessor 630 and dedicated communication link 440. Microprocessor 630 is any general purpose microprocessor known to those skilled in the art.

Memory 640 is a memory subsystem and may be any combination of FLASH, SRAM, DRAM or any other memory components known to those skilled in the art. Memory 640 will typically contain the start-up code for microprocessor 630, the executable code for performing the emulation/simulation, and the behavioral function (i.e., sequential operations model) that behavior card 410 is to perform. In order to allow behavior card 410 to be easily reconfigured, all or part of the data contained in memory 640 may be downloaded from workstation 110 during initialization time. In addition, any data that must be exchanged with emulator/accelerator 310 (not shown) or workstation 110 will also be contained in memory 640. To enhance overall system performance, Direct Memory Access (DMA) may be implemented between network interface 620 and memory 640.

Expansion module 650 adapts the microprocessor bus to communicate with programmable unidirectional Input/ Output (I/O) ports that collectively provide a much wider communication link than the microprocessor bus. This adaptation is also known as memory-mapped I/O. In the simplest case, registers and tri-state buffers can have their clock input and output signals controlled one at a time by decoding the microprocessor address. "Glue" logic may be necessary depending on the nature of the microprocessor bus. The overall purpose of this block is to map the data from a microprocessor data bus with a limited width into a much wider I/O interface whose width is determined by the number of ports for the emulator and the data width of each port.

Emulator interfaces 660 are data latches or registers which work in cooperation with emulator synchronization circuitry 680 to preserve both the data being sent to emulator 310 (not shown) and the data being received from emulator 310. The latched data is preserved in both directions for the duration of the emulation cycle, so that time multiplexing techniques can be used across the data bus by microprocessor 630 to process data for the next emulation cycle in units of its data bus width. Thus, these data latches or registers allow a relatively small microprocessor data bus width to have a much wider I/O interface with the emulator.

Physical interface modules 670 consist of any and all physical connections required to connect behavior card 410 to emulator/accelerator 310 (not shown). This includes any electrical signal conversions (if necessary), wires and other components required to correctly interface behavior card 410 with emulator/accelerator 310.

Emulator synchronization circuitry 680 serves to drive necessary signals to each emulator interface(s) 660 and to microprocessor 630. The signals include, at a minimum, "latch data" and "begin evaluating" signals. Emulator synchronization circuitry 680 may also, as required, contain additional logic to generate additional signals which will enable emulator synchronization circuitry 680 to interact with the emulator clock generator (not shown). This additional circuitry will provide a mechanism to interlock the behavior card 410 process cycle with the process cycle of emulator/accelerator 310 so that emulator/accelerator 310 cannot proceed out of sequence with behavior card 410. Alternatively, if the cycle response time of behavior card 410 can be guaranteed, then no cycle-by-cycle interlock function will be required. However, in many cases, the actual response time of behavior card 410 will vary depending on the process duration and state of microprocessor 630. In those cases, a cycle-by-cycle interlock will be necessary in order to maintain data integrity between emulation cycles.

To perform this interlock, two signals must be generated. First, the "HALT" signal is generated by behavior card 410. This signal is provided to the emulator clock generator (not shown) and when active, prevents the emulator clock generator from issuing the next clock pulse. Thus, HALT must be inactive in order for the emulator clock generator and emulator/accelerator 310 to advance to the next cycle. In the case of multiple behavior cards 410 (as depicted in FIG. 5), each behavior card 410 will be capable of generating a HALT signal which will effectively prevent or control the progression of the emulation cycle.

Dedicated logic on behavior card 410 activates the HALT signal every emulation cycle as soon as possible after receiving the "begin cycle" signal from emulator/accelerator 310. Meanwhile, microprocessor 630 on behavior card 410 detects the "begin cycle" signal and starts to perform the behavior card operations using the data latched in emulator interface(s) 660. Upon completion of the operation, behavior card 410 must decide whether to stop emulator/accelerator 310 or continue to the next cycle. If behavior card 410 goes forward to the next cycle, it must first clear the HALT signal, and will then return to an idle state until the next "begin cycle" command is issued by emulator/accelerator 310. Once the emulator clock generator detects that the HALT signal has been cleared, it allows the next emulator clock pulse to be generated at the end of the current emulation cycle. If, however, behavior card 410 detects a problem, or is not to continue processing, the HALT signal remains active and, in addition, the STOPPED signal is activated. The STOPPED signal alerts the device which is controlling the simulation (workstation 110 or some other designated control processor) that there is a problem that must be serviced and then may continue operations. The control device services behavior card 410 and commands it to clear the STOPPED and HALT signals so that the emulation may continue.

Figure 7:
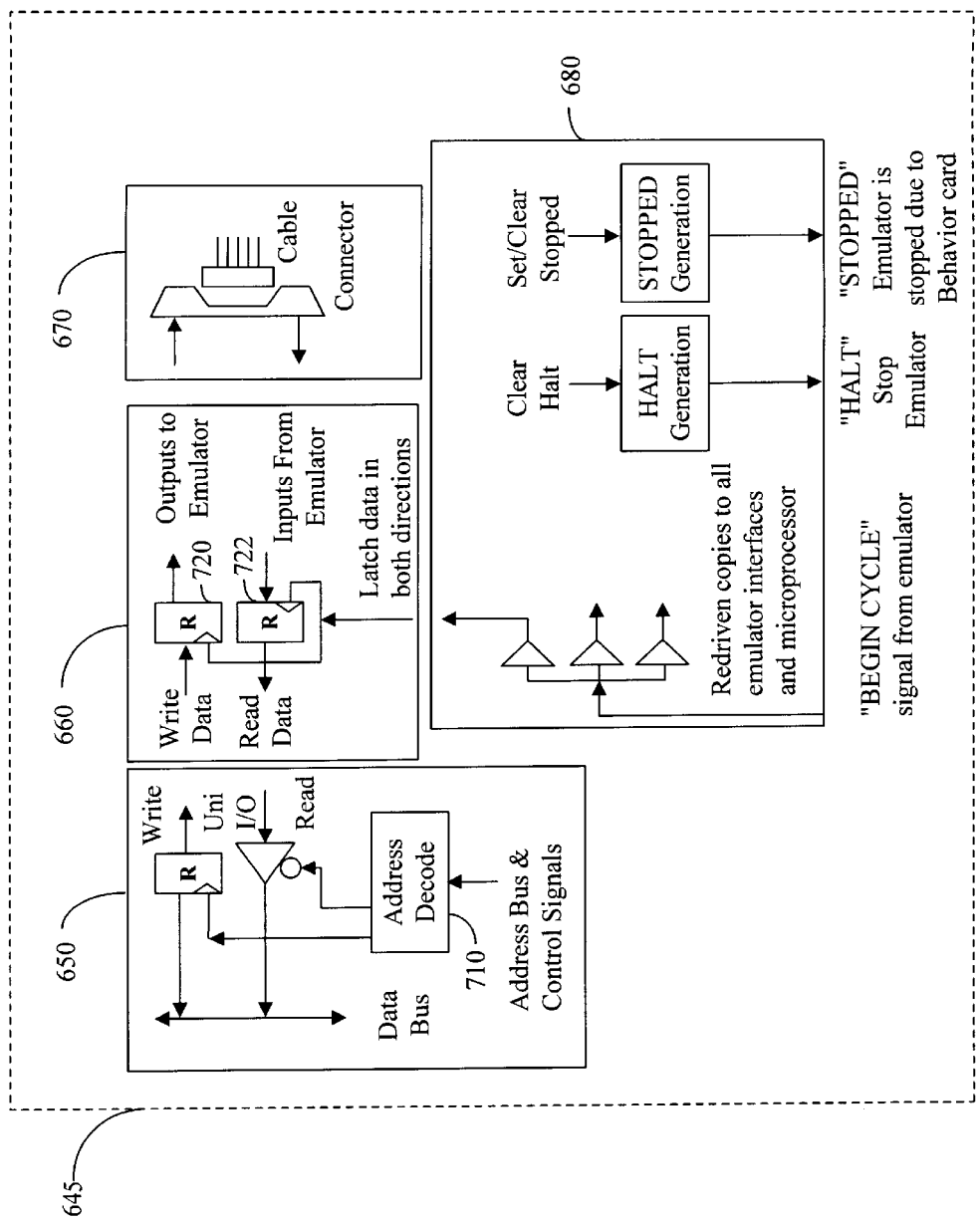
FIG. 7 is an expanded block diagram of some of the components of the behavior card shown in FIG. 6.

Referring now to FIG. 7, the components of interface block 645 are described in more detail. Interface block 645 comprises: expansion module 650; a single emulator interface module 660; a single physical interface module 670; and emulator synchronization circuitry 680. Expansion module 650 provides address decoding 710 for writing and reading data the width of the microprocessor bus to and from a much wider interface to emulator/accelerator 310 (not shown) comprising multiple emulator interfaces 660. Each emulator interface 660 includes one or more output latches or registers 720 to emulator 310 and one or more input latches or registers 722 from emulator 310 that latch data at each synchronization timing interval which is usually the beginning of each emulator cycle and drive the data until the next synchronization timing interval occurs.

It should be noted that the "begin cycle" signal is not restricted to occurring at the beginning of an emulator cycle. Instead, it may be treated as a synchronization timing event which may, in fact represent multiple emulator cycles. Alternatively, sub-emulator cycles or even target system cycles may be used as synchronization timing events, depending on the specific application and emulation environment. In any case, to ensure that behavior card 410 and the other hardware remain synchronized, a synchronization control mechanism is provided. Either behavior card 410 must provide guaranteed response times or the system clock advancement control must be able to recognize the behavior HALT signal and respond accordingly.

Figure 8:
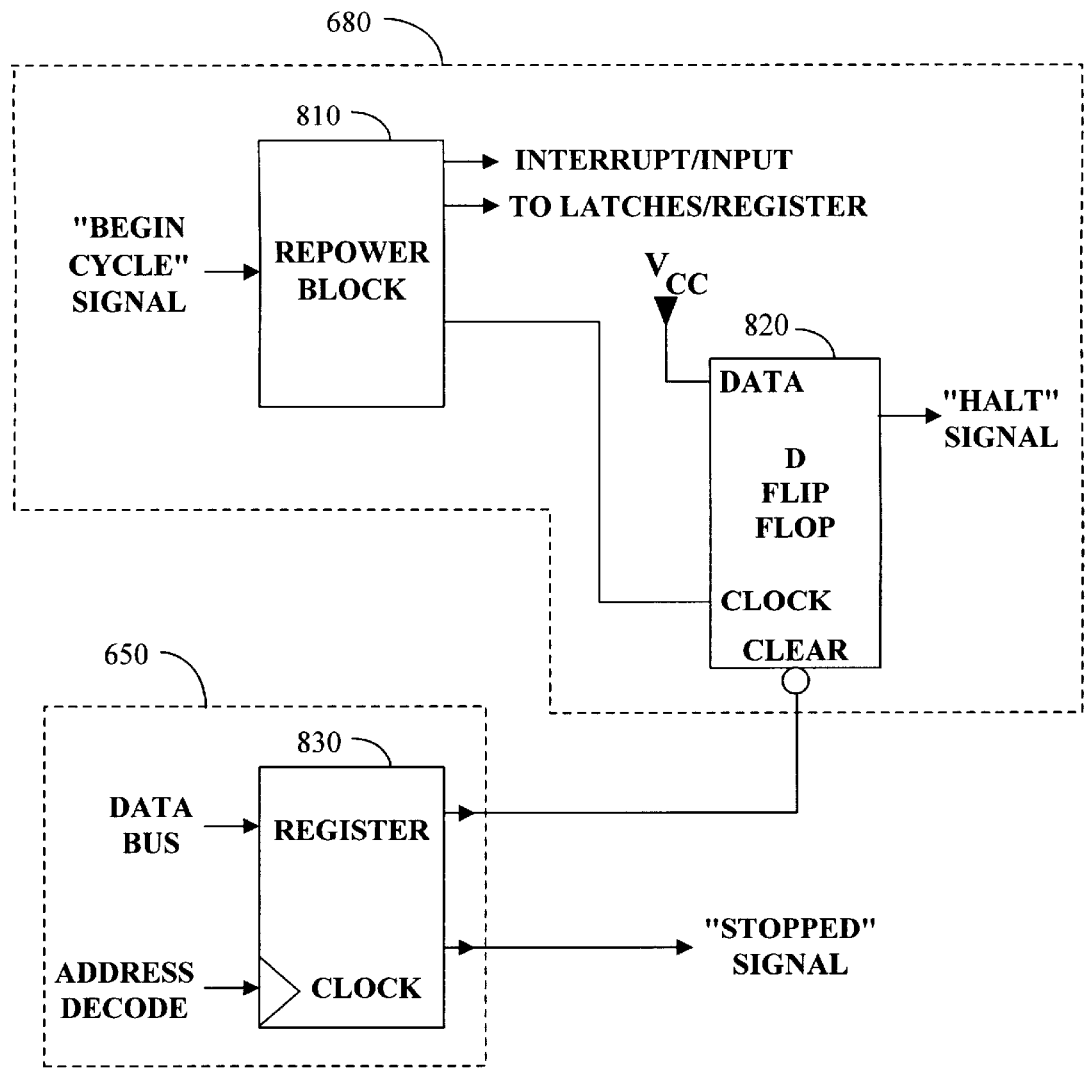
FIG. 8 is a block diagram of the clock synchronization circuitry of FIG. 7.

Referring now to FIG. 8, additional detail of preferred embodiments of expansion module 650 and emulator synchronization circuitry 680 are illustrated. For example, the input to repower block 810 is the "begin cycle" signal from emulator 310 (not shown). Repower block 810 is a repower mechanism that re-transmits the input signal to microprocessor 630 as an interrupt or pollable input signal. In addition, the signal is re-transmitted to latches or registers 720 and 722 in emulator interface 660. This allows latches or registers 720 and 722 to capture and propagate new data. Another output signal from repower block 810 is used to drive the clock signal for D flip flop 820. This clock signal will allow D flip flop 820 to generate the "HALT" signal. Register 830 receives inputs for the data bus and the address decode 710 (not shown) and outputs the "STOPPED" signal. In addition, register 830 outputs the signal that is used to clear D flip flop 820 and remove the "HALT" signal. Both "D" flip-flop and register 830 can be generally considered to be signal generation mechanisms.

Figure 9:
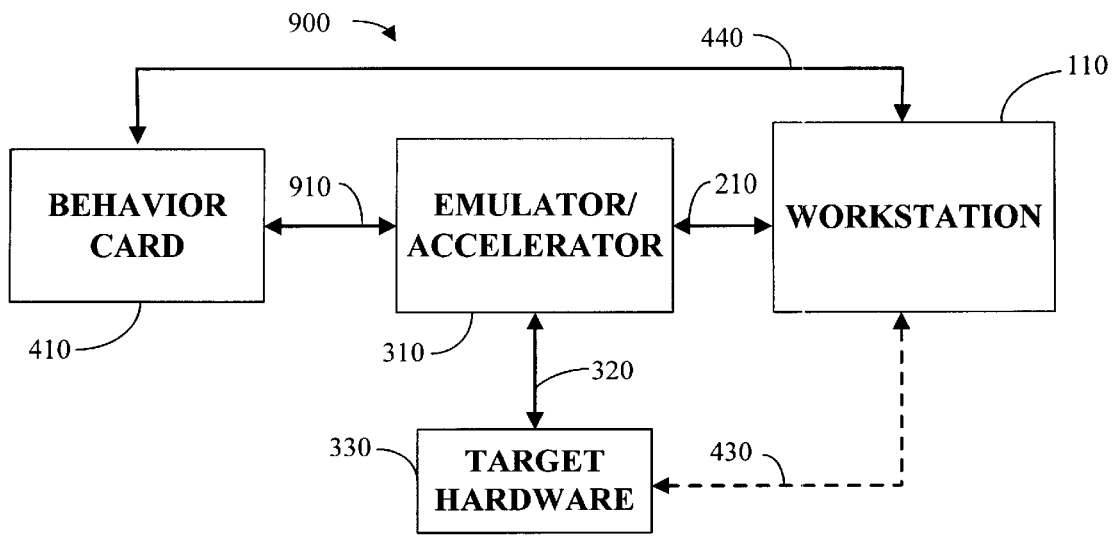
FIG. 9 is a block diagram of an alternative preferred embodiment of the present invention.

Referring now to FIG. 9, a system 900 according to a preferred embodiment of the present invention includes: workstation 110; behavior card 410; target hardware system 330; communication link 210; dedicated communication link 440; and two high-speed/high-bandwidth communication links 320 and 910. This embodiment of the present invention illustrates the versatility of behavior card 410 in another testing environment.

In this embodiment, behavior card 410 is utilized as a physical and logical extension of emulator/accelerator 310. Some of the emulation functions that might have been previously performed by emulator/accelerator 310 are now performed by behavior card 410. This allows emulator/accelerator 310 to be utilized more effectively for certain applications. Emulator/accelerator 310 and behavior card 410 are connected via high-speed communication link 910. In this configuration, behavior card 410 could be used to model a main memory with a large address space or to act as an I/O device model. Alternatively, behavior card 410 might be used to imitate a system and to provide background traffic on internal system busses.

Figure 10:
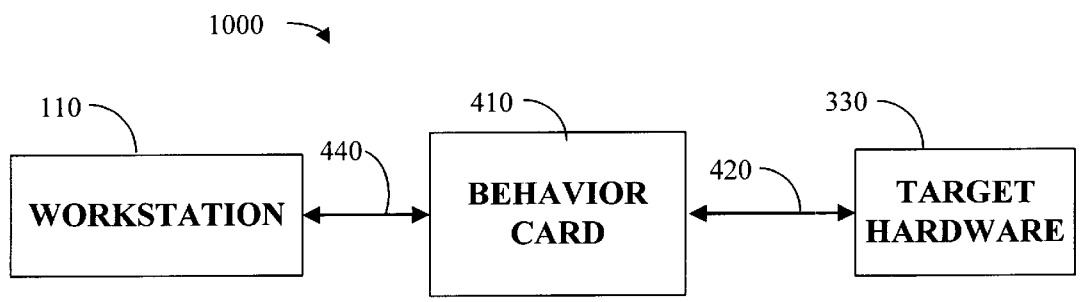
FIG. 10 is a block diagram of an alternative preferred embodiment of the present invention.

Referring now to FIG. 10, a system 1000 for performing burn-in testing according to a preferred embodiment of the present invention includes: workstation 110; behavior card 410; target hardware system 330; high speed communication link 420; and dedicated communication link 440. It is often necessary in a manufacturing environment to perform burn-in testing of hardware, represented in FIG. 10 as target hardware system 330. Burn-in testing consists of testing or exercising a given system or circuit under varying conditions and for relatively long periods of time in order to determine if the performance characteristics of the system or circuit are acceptable. Burn-in testing is often performed on target hardware system 330 to assure that the various components of target hardware system 330 will not fail prematurely (early in their operation life). Premature component failure is a well-known phenomenon in hardware testing and is commonly referred to as "infant mortality."

In this embodiment, there is no emulator/accelerator 310 and workstation 110 once again serves as a program source for behavior card 410. Test vectors and parameters are loaded into behavior card 410 via dedicated communication link 440. After the test vectors and parameters have been loaded into behavior card 410, no further communication between workstation 110 and behavior card 410 is required to perform the burn-in testing of target hardware system 330. Behavior card 410 tests and exercises target hardware system 330 according to the test vectors and parameters received from workstation 110. Behavior card 410 communicates with target hardware system 330 over high-speed communication link 420 to perform the tests and receive feedback from target hardware system 330. After the burn-in testing process has been completed, or intermittently during the process, the results of the process may be passed back to workstation 110 for evaluation via dedicated communication link 440. Since workstation 410 is not directly involved in the testing process and since the various communication links are relatively high-speed, the process can be completed much more quickly and more cost effectively than if the testing process were performed entirely under the control of workstation 110. Workstation 110 is free to perform other tasks during the burn-in testing period and will receive the relevant data from behavior card 410 at the appropriate time. Note also that if workstation 110 only communicates a small amount with behavior card 410, dedicated link 440 may be a relatively slow communication connection. In addition, since the testing has been off-loaded from workstation 110 to behavior card 410, a single workstation 110 may now control multiple behavior cards 410 to test multiple units of target hardware system 330 at the same time.

As FIGS. 4, 5 8, and 9 illustrate, with the associated descriptions above, behavior card 410 provides a very flexible and powerful tool that may have a variety of different uses in hardware emulator and simulator environments. Once the initial development expense of designing the behavior card has been absorbed, the card can be reconfigured and reused to implement a variety of different sequential models. A program is loaded on behavior card 410 to implement a sequential model that previously had been executed by the host workstation. Using this approach, development costs can be reduced.

While the invention has been particularly shown and described with reference to preferred embodiments thereof, it will be understood by those skilled in the art that various changes in form and details may be made therein without departing from the spirit and scope of the invention.

We claim:

1. A hardware emulation and simulation system comprising:
   a hardware test system performing a plurality of concurrent operations;
   at least one sequential control system coupled the hardware test system, the at least one sequential control system performing a plurality of sequential operations such that the performance of at least one of the plurality of concurrent operations and at least one of the plurality of sequential operations occurs in parallel;
   a program source coupled to the sequential control system; and
   a synchronization control mechanism that synchronizes the at least one concurrent operation and the at least one sequential operation, the synchronization control mechanism comprising a synchronization control circuit coupled to the hardware test system and to the sequential control system, the synchronization control circuit synchronizing the operations of the at least one concurrent operation and the at least one sequential operation by driving at least one control signal to the hardware test system and to the sequential control system.

2. The hardware emulation and simulation system of claim 1 wherein the at least one sequential control system further comprises a plurality of input and output latches that are coupled to the hardware test system and that latch data, and wherein the data is time-multiplexed by the sequential control system.

3. A hardware emulation and simulation system comprising:
   an emulator/accelerator, the emulator/accelerator performing at least one concurrent operations;
   a computer workstation coupled to the emulator/accelerator;
   at least one sequential control system coupled to the workstation, the sequential control system performing at least one sequential operation; and
   a synchronization control mechanism comprising a synchronization control circuit coupled to the emulator/accelerator and to the sequential control system, the synchronization control circuit synchronizing the operations of the at least one concurrent operation and the at least one sequential operation by driving at least one control signal to the emulator/accelerator and to the sequential control system.

4. The hardware emulation and simulation system of claim 3 wherein the computer workstation downloads an appropriate program for execution to the sequential control system.

5. The hardware emulation and simulation system of claim 3 wherein the coupling between the computer workstation and the sequential control system comprises a high-speed communication link.

6. The hardware emulation and simulation system of claim 3 further comprising a target hardware system coupled to the emulator/accelerator and to the sequential control system.

7. The hardware emulation and simulation system of claim 3 wherein the sequential control system comprises a microprocessor-based behavior card.

8. The hardware emulation and simulation system of claim 7 wherein the behavior card comprises:
   a microprocessor coupled to a program source;
   a memory coupled to the microprocessor, the memory storing information received from the program source;
   an expansion module having a plurality of individually addressable segments;
   an emulator interface coupled to the expansion module, the emulator interface including a plurality of input latches and a plurality of output latches coupled to at least one of the plurality of individually addressable segments; and
   an emulator synchronization circuit, the emulator synchronization circuit generating at least one control signal.

9. The hardware emulation and simulation system of claim 3 wherein the emulator/accelerator performs at least one of the plurality of concurrent operations in a cycle, and wherein the at least one sequential control system further comprises a plurality of input and output latches that are coupled to the emulator/accelerator and that latch data.

10. The hardware emulation and simulation system of claim 9 wherein the input and output latches latch and hold the data for the entire cycle.

11. The hardware emulation and simulation system of claim 9 wherein the cycle comprises at least two sub-cycles, and wherein the input and output latches latch and hold the data for at least one sub-cycle.

12. The hardware emulation and simulation system of claim 3 wherein the emulator/accelerator performs at least one of the plurality of concurrent operations in a cycle comprising at least two sub-cycles, and wherein the at least one sequential control system further comprises a plurality of buffers that are coupled to the emulator/accelerator and that buffer data for at least one sub-cycle.

13. A hardware emulation system comprising:
   an emulator, the emulator performing a plurality of concurrent operations;
   a target hardware system coupled to the emulator;
   a sequential control system coupled to the target hardware, the coupling between the sequential control system and the target hardware and the coupling between the target hardware and the emulator each comprising a high-bandwidth communication link, the sequential control system performing a plurality of sequential operations such that the performance of at least one of the plurality of concurrent operations and at least one of the plurality of sequential operations occur in parallel; and
   a synchronization control circuit coupled to the emulator and to the sequential control system, the synchronization control circuit synchronizing the operations of the at least one concurrent operation and the at least one sequential operation by driving at least one control signal to the emulator and to the sequential control system.

14. The hardware emulation system of claim 13 wherein the hardware emulation system further comprises a computer workstation coupled to the emulator and to the sequential control system.

15. The hardware emulation system of claim 14 wherein the computer workstation downloads an appropriate program for execution to the sequential control system.

16. The hardware emulation system of claim 14 wherein the coupling between the computer workstation and the sequential control system comprises a high-speed communication link.

17. The hardware emulation system of claim 13 wherein the sequential control system comprises a microprocessor-based behavior card.

18. The hardware emulation system of claim 17 wherein the behavior card comprises:

a microprocessor coupled to an external program source;

a memory coupled to the microprocessor, the memory storing information received from the program source;

an expansion module having a plurality of individually addressable segments;

an emulator interface coupled to the expansion module, the emulator interface including a plurality of input latches and a plurality of output latches coupled to at least one of the plurality of individually addressable segments;

an emulator synchronization circuit, the emulator synchronization circuit generating at least one control signal.

19. A sequential control system comprising:

a microprocessor coupled to an external program source;

a memory coupled to the microprocessor, the memory storing information comprising a plurality of sequential operations received from the program source;

an expansion module having a plurality of individually addressable segments;

an emulator interface coupled to the expansion module, the emulator interface including a plurality of input latches and a plurality of output latches coupled to at least one of the plurality of individually addressable segments; and an emulator synchronization circuit, the emulator synchronization circuit generating at least one control signal that can synchronize an external hardware test system and the sequential control system by synchronizing at least one concurrent operation of the external hardware test system and at least one of the plurality of sequential operations.

20. The sequential control system of claim 19 wherein the sequential control system comprises a behavior card.

21. The sequential control system of claim 19 further comprising a physical interface coupled to the emulator interface.

22. A method for performing behavioral modeling of a circuit in a hardware emulation and simulation environments, the method including the steps of:

providing a microprocessor coupled to an external program source;

providing a memory coupled to the microprocessor, the memory storing information received from the program source;

providing an expansion module having a plurality of individually addressable segments;

providing an emulator interface coupled to the expansion module and coupled to an emulator/accelerator performing a plurality of concurrent operations, the emulator interface including a plurality of input latches and a plurality of output latches coupled to at least one of the plurality of individually addressable segments;

providing an emulator synchronization circuit, the emulator synchronization circuit generating at least one control signal;

downloading a program comprising a plurality of sequential operations from the external program source to the sequential control system;

executing the downloaded program by the sequential control system such that at least one of the plurality of sequential operations is performed concurrently with at least one of the plurality of concurrent operations; and synchronizing the sequential control system and the emulator/accelerator by synchronizing the at least one concurrent operation and the at least one sequential operation.

23. In an emulation/simulation environment with a sequential control system, the sequential control system performing a plurality of sequential operations; and an emulator, the emulator performing at least one of a plurality of concurrent operations in parallel with at least one of the plurality of sequential operations; an apparatus for providing synchronization signals to coordinate the emulation/simulation, the apparatus comprising:

a repower mechanism, wherein the repower mechanism receives an input signal and re-transmits that input signal as an output signal;

a first signal generation mechanism, wherein the first signal generation mechanism receives the output signal from the repower mechanism and generates a "halt" signal as an output signal; and a second signal generation mechanism, wherein the second signal generation mechanism receives a plurality of input signals and provides an output signal to clear the "halt" signal generated by the first signal generation mechanism, wherein the halt signal synchronizes the at least one sequential operation and the at least one concurrent operation; and wherein the second signal generation mechanism also generates a "stopped" signal.

24. The apparatus of claim 23 wherein the first signal generation mechanism comprises a "D" flip-flop.

25. The apparatus of claim 23 wherein the second signal generation mechanism comprises a register.

26. The method of claim 23 wherein the sequential control system further comprises an emulator synchronization circuit that generates at least one control signal for synchronizing the emulator/accelerator, and wherein the method further comprises the step of synchronizing the emulator/accelerator with the sequential control system by synchronizing the at least one sequential operation and the at least one concurrent operation.

* * * * *